United States Patent
Guyader et al.

(10) Patent No.: US 8,807,276 B2
(45) Date of Patent: Aug. 19, 2014

(54) MULTILAYER COMPOSITE MATERIAL

(75) Inventors: Jean-Louis Guyader, Charnoz sur Ain (FR); Husnain Inayat Hussain, Karachi (PK)

(73) Assignee: Institut National des Sciences Appliquees de Lyon, Villeurbanne (FR)

( * ) Notice: Subject to any disclaimer, the term of this patent is extended or adjusted under 35 U.S.C. 154(b) by 0 days.

(21) Appl. No.: 13/515,794

(22) PCT Filed: Dec. 16, 2010

(86) PCT No.: PCT/EP2010/069982
§ 371 (c)(1),
(2), (4) Date: Jun. 13, 2012

(87) PCT Pub. No.: WO2011/073353
PCT Pub. Date: Jun. 23, 2011

(65) Prior Publication Data
US 2012/0279800 A1    Nov. 8, 2012

Related U.S. Application Data

(60) Provisional application No. 61/286,893, filed on Dec. 16, 2009.

(51) Int. Cl.
*E04B 1/84* (2006.01)
*B60R 13/08* (2006.01)
*E04B 1/82* (2006.01)

(52) U.S. Cl.
USPC ............ 181/294; 181/290; 181/286; 181/204

(58) Field of Classification Search
CPC ........... F01N 1/24; F01N 1/00; E04B 1/8218; E04B 1/86; E04B 1/82; G10K 11/16; G10K 11/162; G10K 11/168; B60R 13/08; B60R 13/083; B60R 13/0838; F02B 77/13
USPC ......... 181/294, 290, 286, 284, 207, 208, 209, 181/198–205
See application file for complete search history.

(56) References Cited

U.S. PATENT DOCUMENTS 3,087,568 A  *  4/1963  Kurtze .......................... 181/290
4,450,544 A  *  5/1984  Denaro et al. ................ 367/176

(Continued)

OTHER PUBLICATIONS

Husnain Inayat Hussain:"Thermoviscous Effects in Acoustic Radiation Problems;" Thése pour le grade de Docteur, Sep. 30, 2009, pp. 57, 102-105, XP002635901, Retrieved from the Internet: U:http://docinsa.insa-lyon.fr/these/2009/inaya_thussain/these.pdf [retrieved May 4, 2011]; 6 pages.

(Continued)

*Primary Examiner* — Edgardo San Martin
(74) *Attorney, Agent, or Firm* — Blakely Sokoloff Taylor & Zafman

(57) ABSTRACT

The invention concerns a multilayer composite material comprising at least one core (3) interposed between two external layers (1, 2), wherein: —the core (3) is a layer of thermoviscous fluid at room temperature, said thermoviscous fluid having a dynamic viscosity coefficient greater than 100 Pa·s at room temperature, —each external layer (1, 2) is in a material in the solid state at room temperature, each external layer having a surface mass of less than 8 kg/m$^2$.

14 Claims, 3 Drawing Sheets

(56) References Cited

U.S. PATENT DOCUMENTS

Figure 1:
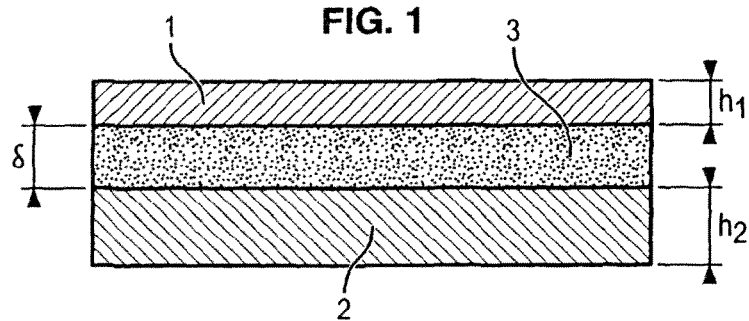

| | | | | |
|---|---|---|---|---|
| 4,523,612 A | * | 6/1985 | Kuklo | 138/30 |
| 4,629,432 A | * | 12/1986 | Dyrkorn et al. | 440/52 |
| 4,683,979 A | * | 8/1987 | Ghibu et al. | 181/286 |
| 4,759,000 A | * | 7/1988 | Reitz | 367/176 |
| 4,815,050 A | * | 3/1989 | Kurz | 367/176 |
| 4,817,757 A | * | 4/1989 | Perret et al. | 181/288 |
| 4,903,793 A | * | 2/1990 | Firey | 181/0.5 |
| 5,138,588 A | * | 8/1992 | Chuan et al. | 367/176 |
| 5,536,910 A | * | 7/1996 | Harrold et al. | 181/290 |
| 5,621,701 A | * | 4/1997 | Denaro et al. | 367/151 |
| 7,896,126 B1 | * | 3/2011 | Haberman et al. | 181/209 |
| 2007/0151796 A1 | * | 7/2007 | Heid | 181/207 |
| 2007/0284185 A1 | * | 12/2007 | Foss | 181/207 |
| 2008/0318065 A1 | | 12/2008 | Sherman et al. | |

OTHER PUBLICATIONS

Rhodorsil® Oils 47, Technical Information; Bluestar Silicones; 24 pages, undated.

Husnain Inayat Hussain, Jean-Louis Guyader: "An Equivalent Model for Sandwiched Panels with Thermoviscous Fluid Core;" Laboratoire Vibrations Acoustique, IINSA-Lyon, F-69621, 2009, France; 11 pages.

* cited by examiner

MULTILAYER COMPOSITE MATERIAL

This is a non-provisional application claiming the benefit of U.S. Provisional Application No. 61/286,893, filed Dec. 16, 2009, and International Application Number PCT/EP2010/069982 filed Dec. 16, 2010.

TECHNICAL FIELD

The present invention relates to the general technical field of multilayer composite materials. The invention also relates to a method for dimensioning such a multilayer material.

PRIOR ART

Multilayer materials have vibration damping properties which are in particular utilized for reducing propagation of noise.

Multilayer materials such as sandwich metal sheets, are for example used for making body members of vehicles or trim panels of domestic appliances. Other types of multilayer materials such as double glazings may be used in other applications.

In the state of the art multilayer materials are already known, including two outer soles between which is inserted a low density core, such as a polymer layer.

A drawback of this type of material is that it only allows damping of vibrations for certain frequency ranges. In particular the multilayer materials as described above do not allow damping of vibrations with a frequency comprised between 20 Hz to 20 kHz (low frequency vibrations).

An object of the present invention is to propose a composite material with which at least the aforementioned drawback may be overcome.

SUMMARY OF THE INVENTION

For this purpose, the invention proposes a multilayer composite material comprising at least one core interposed between two external layers, wherein:
- the core is a layer of thermoviscous fluid at room temperature, said thermoviscous fluid having a dynamic viscosity coefficient greater than 100 Pa·s at room temperature,
- each external layer is in a material in the solid state at room temperature, each external layer having a surface mass of less than 8 kg/m².

By <<thermoviscous fluid layer>>, within the scope of the present invention, is meant a fluid layer which takes into account heat exchange between the particles by conductivity and takes into account shearing between the particles by viscosity. In other words, by thermoviscous fluid, within the scope of the present invention, is meant a fluid causing thermoviscous losses, i.e. converting the waves into heat energy and, thereby reducing acoustic energy. The thermoviscous fluid is for example silicone oil, very highly sweetened water (for example of the syrup type).

Moreover, a composite material is a material being able to be embossed.

Finally, by <<room temperature>> is meant a temperature of the order of 25° C.

PRESENTATION OF THE FIGURES

Figure 3:
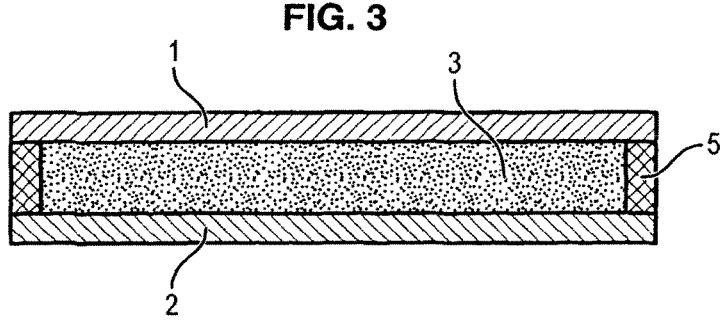
Figure 4:
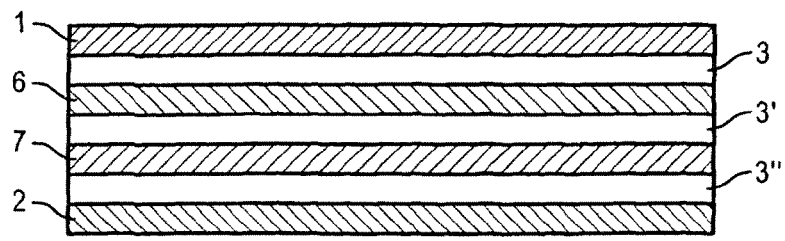
Figure 5:
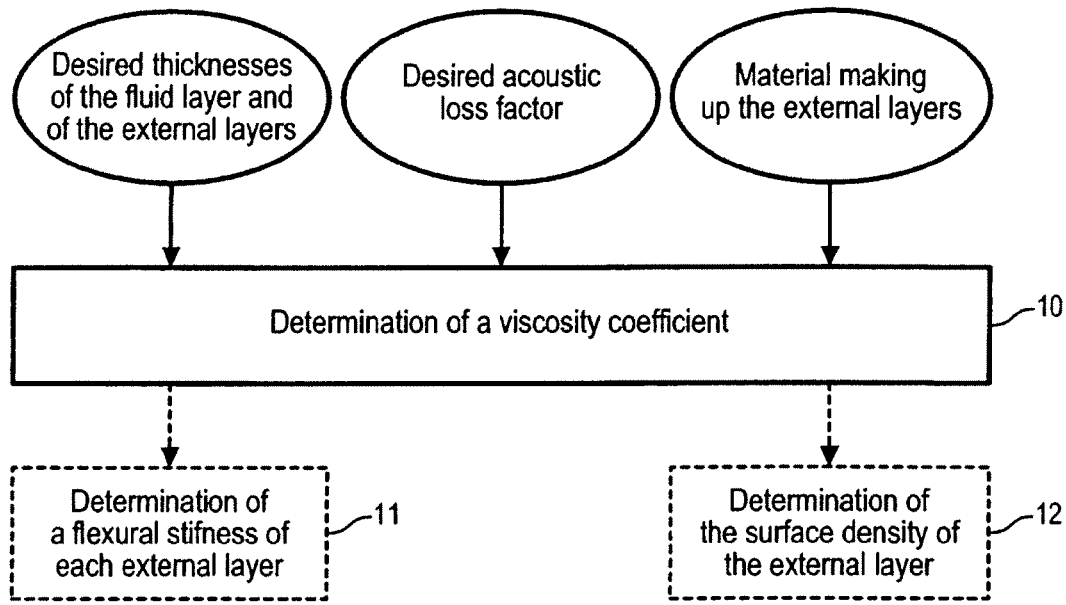
Figure 6:
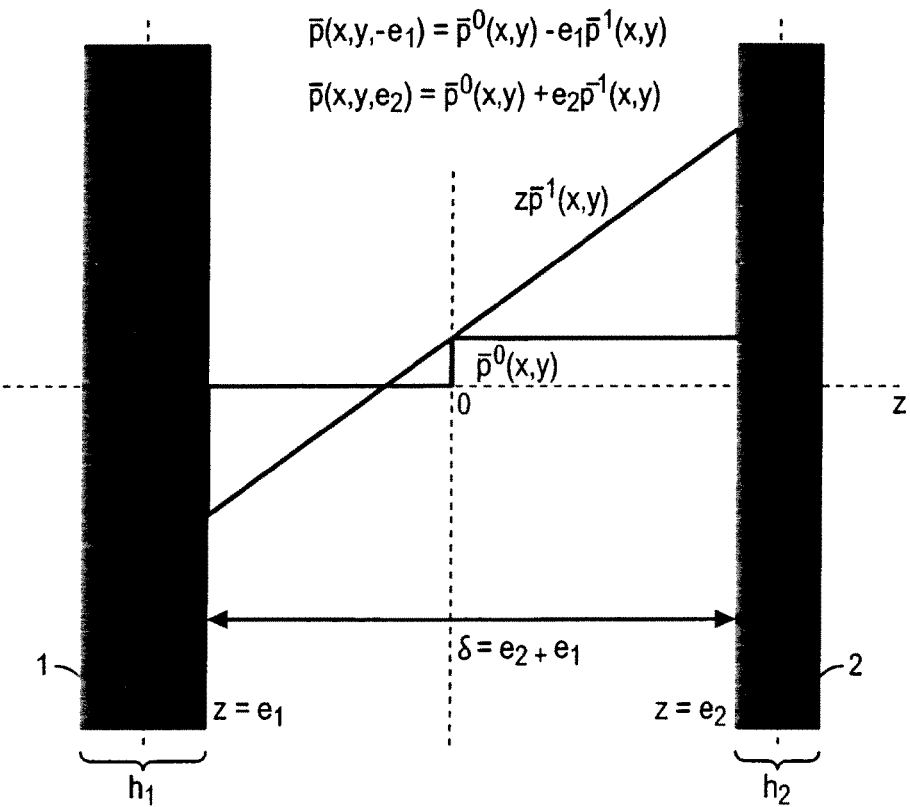
Figure 7:
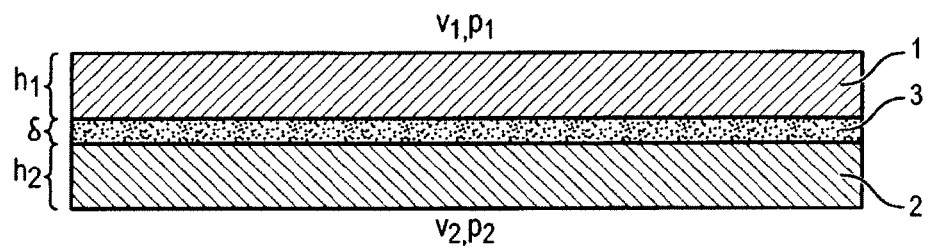
Figure 8:
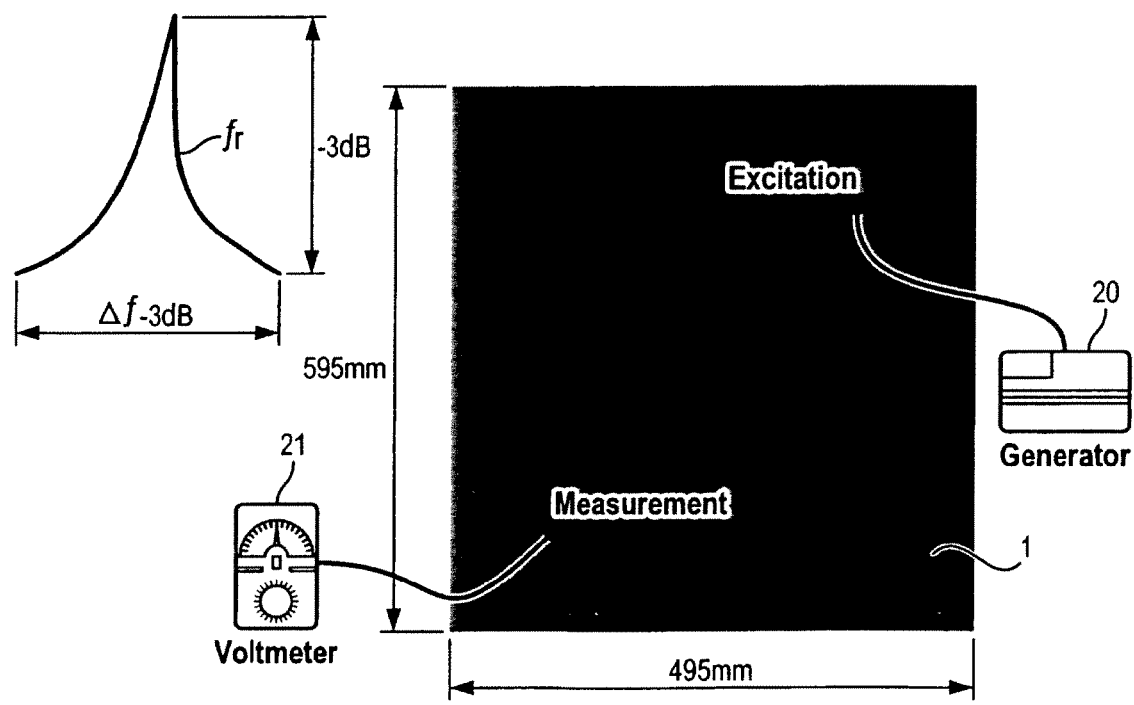

Other characteristics and advantages of the multilayer composite material according to the invention will become further apparent from the following description which is non-limitative and solely illustrative, and is to be read in connection with the appended drawings, in which:

FIGS. 1 to 4, 6 and 7 are cross section views of different embodiments of the multilayer composite material according to the invention, FIG. 5 is a schematic illustration of a method for making a multilayer composite material according to the invention, FIG. 8 is a schematic view illustrating an experimental setup.

DETAILED PRESENTATION OF THE INVENTION

With regard to FIG. 1, the multilayer composite material comprises at least one core 3 interposed between two external layers 1, 2. The core 3 is a layer of thermoviscous fluid at room temperature, said thermoviscous fluid having a dynamic viscosity coefficient greater than 100 Pa·s at room temperature. Each external layer 1, 2 is in a material in the solid state at room temperature, each external layer 1, 2 having a surface mass of less than eight kg/m².

As compared with sandwich metal sheets comprising a core in the solid state at room temperature, this particular combination allows damping of vibratory waves regardless of their frequencies, and reduces the associated sound emission.

The material making up the external layers 1, 2 is for example metal, glass or plastic. These external layers 1, 2 may either be planar plates or not.

The thermoviscous fluid is a liquid having a dynamic viscosity coefficient greater than 100 Pa·s at room temperature, such as oil. For instance, in one embodiment, the thermoviscous material is Rhodorsil®. Rhodorsil® Oils 47 are polydimethyl siloxane oils. They are constituted of linear molecular chains of varying lengths whose groups comprise alternating silicon and oxygen atoms (the Si—O—Si siloxane bond). The silicon atoms are saturated by methyl groups—CH3. Whilst the carbon chains of organic substances generally have low resistance to external influences, the stability of the Si—O bonds is basically comparable to that of inert mineral silicates. Rhodorsil® Oils 47 are fabricated in a variety of range. This range is indicated by a number which follows the letter "V" and its value can vary/from 100 to 1,000,000. This number denotes the kinematic viscosity in mm2=s at 25° C. Thus, Rhodorsil® 47 V 100 implies an oil which has a kinematic viscosity of 100 mm2=s.

In one embodiment, the viscosity coefficient of the thermoviscous fluid is greater than 240 Pa·s, and preferentially greater than 480 Pa·s. The greater the viscosity coefficient of the thermoviscous fluid, the more significant is the acoustic energy loss factor. In other words, the greater the viscosity coefficient of the thermoviscous fluid, the more significant is the damping of the vibratory waves.

The thickness δ of the thermoviscous fluid layer 3 may be up to zero and less than or equal to twice the acoustic limiting layer of the thermoviscous fluid. The acoustic limiting layer is the centre of thermoviscous phenomena associated with acoustic energy losses. The thickness of the acoustic limiting layer depends on the ratio between the dynamic viscosity coefficient of the fluid and the frequency of the vibratory wave, the damping of which is desired. For example for the audible area in air at 15° C., the acoustic limiting layer is 0.5 millimeter at 20 Hz and 0.02 millimeters at 20 kHz. For Rhodorsil® this is 88.7 mm at 20 Hz and 2.8 mm at 20 kHz. Because the thickness of the thermoviscous fluid layer 3 is less than or equal to twice that of the acoustic limiting layer of the thermoviscous fluid, it is possible to deposit an optimum layer of thermoviscous fluid. Indeed, damping of vibratory waves occurs in the acoustic limiting layers (or Stokes' limiting layers). Thus a thermoviscous fluid layer thickness greater than twice the acoustic limiting layer has the same acoustic energy loss factor than a thermoviscous fluid layer having a thickness equal to twice the acoustic limiting layer.

In some embodiments, the thickness δ of the thermoviscous fluid layer 3 is comprised between 0.001 millimeter and 3 millimeters. It will be noted that the greater the thickness of the thermoviscous fluid, (while being less than twice the wave limiting layer of the fluid), the more significant is the damping of the vibratory waves.

If the thickness δ of the thermoviscous fluid layer 3 exceeds the natural thickness of the latter, it becomes preferable to trap it by confining it between both external layers.

By "natural thickness of the fluid" within the scope of the present invention, is meant the thickness of the fluid when the latter is spread out on a planar support without any external stress.

If the thickness δ of the thermoviscous fluid layer 3 is equal to or less than the natural thickness of the latter, the thermoviscous fluid layer 3 is naturally maintained in place between both external layers.

Advantageously, the thermoviscous fluid layer 3 may be a silicone oil. This allows using the composite material at high temperatures (for example 200° C.). Indeed, silicone oil has good resistance to temperature.

The external solid layers 1, 2 may be made of different materials. Moreover, the external solid layers may be of different thicknesses h1, h2. This allows a better adaptation of the composite material to a given application.

Figure 2:
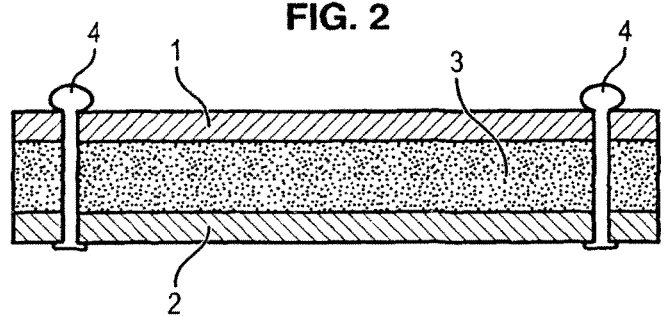

In the embodiment illustrated at FIG. 2, the external solid layers 1, 2 are attached, for example riveted using rivets 4, together.

As shown in FIG. 3, the thermoviscous fluid layer 3 may be trapped by confining it between the solid external layers. In the embodiment of FIG. 3, the thermoviscous fluid layer is confined in a closed housing defined by the two solid external layers 1, 2 and walls 5, for instance made of silicon, extending at the boundaries of the solid external layers 1, 2.

In FIG. 4, the composite material comprises a plurality of cores 3, 3', 3" between both external layers 1, 2. The cores 3, 3', 3" are separated from each other with layers 6, 7 in a material in the solid state at room temperature and having a surface mass of less than 8 kg/m². The solid layers 1, 2, 6, 7 may be made of different materials and may have different thicknesses. The thermoviscous fluid layers 3, 3', 3" may also have different thicknesses and may be made of different materials having different viscosity coefficients.

Notably, provision may be made for materials comprising for example five layers: three layers in the solid state and two thermoviscous fluid layers positioned alternately. In the case of a composite material comprising more than three layers, the thermoviscous fluid layers and the solid state layers have the same characteristics as those defined above. It will be noted that the thermoviscous fluid layers may.

The multilayer composite material described above may be used as a device for damping vibratory waves.

FIG. 5 illustrates a method for making a multilayer composite material according to the invention. The multilayer composite material comprises at least one core interposed between two external layers, the core being a thermoviscous fluid layer at room temperature, and each external layer being in a material in the solid state at room temperature.

The method comprises the calculation 10 of a viscosity coefficient as a function of:
 the respective thicknesses of the fluid layer and of the external layers,
 the material making up each external layer,
 a desired acoustic loss factor.

The method may further comprise a step of determining 11 the flexural stiffness of each external layer from the material making them up.

The method may also comprise a step of determining 12 the surface mass of each external layer from the material making them up.

The different characteristics of the thermoviscous fluid layer—such as the thermoviscous fluid, or the thickness of the thermoviscous fluid, etc. —may be determined, for a given application, by using the following equation:

$$\eta_D = \frac{\Lambda}{\sqrt{D_{eq} + M_{eq}}}$$

With:

$$\Lambda = \left(\frac{h_1 + h_2}{2}\chi + \delta\mu\right),$$

wherein $\chi = \mu_B + \frac{1}{3}\mu$ $D_{eq} = D_1 + D_2$, wherein $D_1 = \frac{E_1 h_1^3}{12(1-v_1^2)}$, and $D_2 = \frac{E_2 h_2^3}{12(1-v_2^2)}$ $M_{eq} = \rho_1 h_1 + \rho_2 h_2$ Where:
 $\eta_D$ is the acoustic loss factor due to the viscous layer,
 E1 is the Young's modulus of the first external solid layer 1 having a thickness h1, and a mass density $\rho_1$
 E2 is the Young's modulus of the second external solid layer 2 having a thickness h2, and a mass density $\rho_2$
 $v_1$ is Poisson's ratio of the first external solid layer 1,
 $v_2$ is Poisson's ratio of the second external solid layer 2,
 $\mu_B$ is the density viscosity coefficient of the thermoviscous fluid layer (considered equal to zero)
 $\mu$ is the coefficient of viscosity of the thermoviscous fluid layer.

Thus, knowing the characteristics of the external solid layers (material, thickness) and the acoustic loss factor desired, it is for instance possible to determine the thickness and the material to be used for the thermoviscous fluid layer, etc.

More detailed explanations for understanding how the above equations have been defined by the inventors are given herebelow. Exemplary embodiments of the composite material according to the invention are also described herebelow.

The results of tests carried out by using silicone oil Rhodorsil® are also described.

Theory Relative to the Invention

Abstract

A method has been developed to predict the damping behavior of an equivalent plate to sandwiched panels with thermoviscous fluid core, which is based on an asymptotic approach. The technique works on the break up of the basic physical quantities such as pressure, temperature and particle velocities as constants and linear functions of the z coordinate which signifies the perpendicular direction from the plate mid surface. The asymptotic modelling is performed in a very thin and highly viscous fluid layer on the full set of linearized Navier Stokes equations. The use of highly viscous fluid layers such as Rhodorsil® 47 oils, yields high damping coefficients. Experimental validation provides a good agreement with the theoretical results.

Introduction

Hereafter, a sandwiched panel with a thin thermoviscous fluid layer is studied and an equivalent simplified plate equation is proposed. The damping loss factor of the panel is derived and it is shown that high loss factor can be obtained. Sound propagation in these models is computed using a modified Helmholt'z equation. Before obtaining this equation, the fundamental conservation principles are simplified with emphasis on the viscosity and conductivity of the acoustic media. The model presented here is based on asymptotic development of the solutions for a thin thermoviscous layer and shows that only the viscosity of the media is governing the equivalent plate damping.

Validations of the prediction is made from an experiment using highly viscous fluids such as Rhodorsil® 47 oils.

Linearized Fundamental Equations for Thermoviscous Media

In majority of the vibroacoustic problems the acoustic pressure is presented in relation with the normal particle velocity. So, the temperature changes related with the thermal conductivity of the fluid and the tangential particle velocities related with the shearing action of the particles are ignored because of their limited influence just within the boundary layer. However, under particular circumstances, such as double wall panels, these thermoviscous effects could play an important role in totally changing the characteristics of the acoustic radiation. A very initial work on thermoviscous media was introduced by Gustav Kirchhoff. Kirchhoff uses the Navier-Stokes equations and the Fourier Law of heat conduction to come up with a model of propagation in thermoviscous fluids in infinite space as well as in closed spaces such as capillaries, pores and cracks of materials. The linearized equations of the propagation in thermoviscous media used in this model are given as:

$$\frac{\partial \rho'}{\partial t} + \rho_o \nabla \cdot \vec{u}' = 0 \quad (1)$$

$$\rho_o \frac{\partial u'_x}{\partial t} = -\frac{\partial p'}{\partial x} + \left(\mu_B + \frac{1}{3}\mu\right)\frac{\partial}{\partial x}(\nabla \cdot \vec{u}') + \mu \Delta \vec{u}' \quad (2)$$

$$\rho_o \frac{\partial u'_y}{\partial t} = -\frac{\partial p'}{\partial y} + \left(\mu_B + \frac{1}{3}\mu\right)\frac{\partial}{\partial y}(\nabla \cdot \vec{u}') + \mu \Delta \vec{u}' \quad (3)$$

$$\rho_o \frac{\partial u'_z}{\partial t} = -\frac{\partial p'}{\partial z} + \left(\mu_B + \frac{1}{3}\mu\right)\frac{\partial}{\partial z}(\nabla \cdot \vec{u}') + \mu \Delta \vec{u}' \quad (4)$$

$$\rho_o T_o \frac{\partial s'}{\partial t} = \lambda \Delta T' \quad (5)$$

Here $\rho 0$ denotes the variation in fluid mass density, $\vec{\mu}'$ denotes the variation in particle velocity vector of the fluid, p' represents the pressure variation, $\mu_B$ denotes the coefficient of bulk viscosity (also known as the volume viscosity) and $\mu$ represents the coefficient of dynamic viscosity (also called as the coefficient of shear viscosity). $\mu_B$ is further defined as follows:

$$\mu_B = \eta + \frac{2}{3}\mu$$

where $\eta$ is the second coefficient of viscosity. $\lambda$ is the thermal conductivity of the fluid and s' is the variation in the specific entropy of the fluid. The quantities with subscript o show values in equilibrium state. The equations presented above have more unknowns than the number of equations and therefore, linearized thermodynamical relations, shown with the help of Eq. (6), are used to reduce the number of unknowns equal to the number of equations.

$$\rho' = \frac{\gamma}{c_o^2}(p' - \hat{\beta}T') \quad (6)$$

$$s' = \frac{C_p}{T_o}\left(T' - \frac{\gamma-1}{\gamma\hat{\beta}}p'\right)$$

Here, $\gamma$ is the ratio of the specific heat capacities and $\hat{\beta}$ is the ratio of equilibrium pressure $p_0$ by the equilibrium temperature $T_0$ at constant density. Note that we have used Eq. (5), the entropy equation, in our model but the following energy equation could equally be used.

$$\rho_o \frac{\partial e'}{\partial t} = -p_o(\nabla \cdot \vec{u}') + \lambda \Delta T'$$

e' represents the specific internal energy of the system,

The Asymptotic Method

The asymptotic method consists of decomposing the pressure, temperature and the velocity fields as sums of constants and polynomials in z. Due to small thickness of the fluid film, one can expect that first order terms are sufficient to approximate the model well. The quantities that are referred to here are already linearized terms and therefore this method implies a break up of these already linearized terms as constants and polynomials. Assuming a harmonic time dependence on $e^{jwt}$ and having already simplified its contribution, this method is elaborated with the help of Eq. (7).

$$\begin{cases} \bar{p}'(x,y,z) = \bar{p}^{(o)}(x,y) + z\bar{p}^{(1)}(x,y) + \ldots \\ \bar{T}'(x,y,z) = \bar{T}^{(o)}(x,y) + z\bar{T}^{(1)}(x,y) + \ldots \\ \bar{u}'_x(x,y,z) = \bar{u}^{(o)}_x(x,y) + z\bar{u}^{(1)}_x(x,y) + \ldots \\ \bar{u}'_y(x,y,z) = \bar{u}^{(o)}_y(x,y) + z\bar{u}^{(1)}_y(x,y) + \ldots \\ \bar{u}'_z(x,y,z) = \bar{u}^{(o)}_z(x,y) + z\bar{u}^{(1)}_z(x,y) + \ldots \end{cases} \quad (7)$$

The quantities on the left hand side are the unknowns and the right hand side shows the break up. Only first order terms are shown but higher order terms 1 could be included for more detailed analysis. The idea of the asymptotic method is further elaborated with the help of FIG. 6. Two plates 1, 2 of unequal thickness h1 and h2 respectively are placed against each other, aligned at their center. The first plate is placed at $z=-e_1$ whereas the second plate is located at $z=e_2$. Hence the fluid layer thickness between the two plates, $\delta$, is the sum, $e_2+e_1$.

In the figure, pressure is taken for example. At the origin is shown the constant term, $p_o(x; y)$, which is independent of the z coordinate. The first order term is shown to be $zp(x; y)$, which varies linearly along the z direction. This figure is a simple example of a first order pressure variation. Other quantities vary in the same manner.

Boundary Conditions

In this section the general asymptotic expansion is particularized in order to fulfil the boundary conditions on plates' surfaces.

1. Temperature: Isothermal walls are considered at both the ends and so:

$$T'(x,y,-e_1)=0$$

$$T'(x,y,e_2)=0$$

Considering these relations at the first order asymptotic expansion, the following may be written:

$$\overline{T}^{(o)}(x,y)-e_1\overline{T}^{(1)}(x,y)=0$$

$$\overline{T}^{(o)}(x,y)-e_2\overline{T}^{(1)}(x,y)=0$$

The above homogeneous linear system has no solution which implies that $T^o(x,y)=T^1(x,y)=0$.

2. In-plane Velocity: Only the velocity in the x direction will be explained. The velocity in the y direction may be deduced in a similar manner. When the plates bend under the influence an excitation, one of the plates undergoes a state of tension whereas the other one goes into compression. This generates a shear in the fluid layer trapped between the two plates, such that the tangential velocity of the plate is proportional to the normal velocity. Equating this velocity with the tangential particle velocity, the following relation is obtained:

$$\overline{u}'_x(x, y, -e_1) = -j\omega \frac{h_1}{2}\overline{w}_{1,x} \quad (9)$$

$$\overline{u}'_x(x, y, e_2) = j\omega \frac{h_2}{2}\overline{w}_{2,x}$$

Substitution of this condition in Eq. (7) for the tangential velocity variation results in the following linear system:

$$\overline{u}_x^{(o)}(x, y) - e_1 \overline{u}_x^{(1)}(x, y) = -j\omega \frac{h_1}{2}\overline{w}_{1,x} \quad (10)$$

$$\overline{u}_x^{(o)}(x, y) + e_2 \overline{u}_x^{(1)}(x, y) = j\omega \frac{h_2}{2}\overline{w}_{2,x}$$

This linear system has the following solution:

$$\overline{u}_x^{(o)}(x, y) = j\frac{\omega}{2\delta}(e_1 h_2 \overline{w}_{2,x} - e_2 h_1 \overline{w}_{1,x}) \quad (11)$$

$$\overline{u}_x^{(1)}(x, y) = j\frac{\omega}{2\delta}(h_1 \overline{w}_{1,x} + h_2 \overline{w}_{2,x})$$

The particle velocity in the y direction is assumed to have the same form. It is only sufficient to replace the subscripts x by y in the above equation.

3. Normal Velocity: The conventional normal velocity equality condition at the plates is imposed.

$$\overline{u}'_z(x,y,-e_1)=j\omega\overline{w}_1(x,y)$$

$$\overline{u}'_z(x,y,e_2)=j\omega\overline{w}_2(x,y)$$

Substituting this in Eq. (7) for the normal particle velocity provides with the following linear system:

$$\overline{u}_z^{(o)}(x,y)-e_1\overline{u}_z^{(1)}(x,y)=j\omega\overline{w}_1(x,y)$$

$$\overline{u}_z^{(o)}(x,y)+e_2\overline{u}_z^{(1)}(x,y)=j\omega\overline{w}_2(x,y) \quad (12)$$

This system has the following symbolic solution:

$$\overline{u}_z^{(o)}(x, y) = j\frac{\omega}{\delta}(e_2\overline{w}_1 + e_1\overline{w}_2) \quad (14)$$

$$\overline{u}_z^{(1)}(x, y) = j\frac{\omega}{\delta}(\overline{w}_1 - \overline{w}_2)$$

Combining the above equations the following result is produced as first order asymptotic approximation in the thermoviscous fluid layer:

$$T'(x, y, z) = 0 \quad (15)$$

$$\overline{u}'_x(x, y, z) = j\frac{\omega}{2\delta}(e_1 h_2 \overline{w}_{2,x} - e_2 h_1 \overline{w}_{1,x} + z h_1 \overline{w}_{1,x} + z h_2 \overline{w}_{2,x})$$

$$\overline{u}'_y(x, y, z) = j\frac{\omega}{2\delta}(e_1 h_2 \overline{w}_{2,y} - e_2 h_1 \overline{w}_{1,y} + z h_1 \overline{w}_{1,y} + z h_2 \overline{w}_{2,y})$$

$$\overline{u}'_z(x, y, z) = j\frac{\omega}{\delta}(e_2\overline{w}_1 + e_1\overline{w}_2 + z\overline{w}_1 - z\overline{w}_2)$$

Zeroth Order Solution of the Thermoviscous Fluid Equation

The expressions for the pressure, temperature and velocities are substituted in the linearized set of fundamental equations as presented in §(2). Subsequently the zeroth order terms and the first order terms are separated. The asymptotic substitution in the governing equations gives rise to four zeroth order and four first order equations. In order to proceed forward with the method, each of these equations must be satisfied. The low order equations are the most significant, the higher order terms provide more details. A satisfactory solution could be obtained by considering only the low order equations. In the present work the analysis will be curtailed to the zeroth order equations only, which are compatible with first order approximation of pressure, velocities and temperature given in Eq. (15) Therefore, the four equations which must be satisfied are given underneath:

$$\overline{p}^{(o)}(x, y) = \frac{\rho_o c_o^2}{2\gamma\delta}(e_2 h_1 \overline{w}_{1,xx} - e_1 h_2 \overline{w}_{2,xx} + e_2 h_1 \overline{w}_{1,yy} - e_1 h_2 \overline{w}_{2,yy}) + \quad (16)$$

$$\frac{\rho_o c_o^2}{\gamma\delta}(\overline{w}_1 - \overline{w}_2)$$

$$\overline{p}_{,x}^{(o)}(x, y) = \quad (17)$$
$$j\frac{\omega}{2\delta}(\chi + \mu)(e_1 h_2 \overline{w}_{2,xxx} - e_2 h_1 \overline{w}_{1,xxx} + e_1 h_2 \overline{w}_{2,xyy} - e_2 h_1 \overline{w}_{1,xyy}) +$$
$$j\frac{\omega}{\delta}\chi(\overline{w}_{2,x} - \overline{w}_{1,x}) + \frac{\rho_o \omega^2}{2\delta}(e_1 h_2 \overline{w}_{2,x} - e_2 h_1 \overline{w}_{1,x})$$

$$\overline{p}_{,y}^{(o)}(x, y) = \quad (18)$$
$$j\frac{\omega}{2\delta}(\chi + \mu)(e_1 h_2 \overline{w}_{2,yyy} - e_2 h_1 \overline{w}_{1,yyy} + e_1 h_2 \overline{w}_{2,xxy} - e_2 h_1 \overline{w}_{1,xxy}) +$$
$$j\frac{\omega}{\delta}\chi(\overline{w}_{2,y} - \overline{w}_{1,y}) + \frac{\rho_o \omega^2}{2\delta}(e_1 h_2 \overline{w}_{2,y} - e_2 h_1 \overline{w}_{1,y})$$

$$\overline{p}^{(1)}(x, y) = j\frac{\omega}{2\delta}\chi(h_1 \overline{w}_{1,xx} + h_2 \overline{w}_{2,xx} + h_1 \overline{w}_{1,yy} + h_2 \overline{w}_{2,yy}) + \quad (19)$$
$$j\frac{\omega}{\delta}\mu(e_2\overline{w}_{1,xx} + e_1\overline{w}_{2,xx} + e_2\overline{w}_{1,yy} + e_1\overline{w}_{2,yy}) + \frac{\rho_o \omega^2}{\delta}(e_2\overline{w}_1 + e_1\overline{w}_2)$$

Here $\chi$ denotes the sum $$\mu_B + \frac{1}{3}\mu.$$

These zeroth order equations correlate the pressure functions in terms of the displacements of the two plates. The first three equations express the function $p^{(0)}(x; y)$ in different forms. One way to verify the first three equations is to substitute Eq. (16) into Eq. (17) and Eq. (18). This yields two equations in terms of the plate displacements only. Hence, this substitution would produce the equation of motion of the plates. The last of the four equations furnishes an expression for the pressure function $p^{(1)}$, which is also given in terms of the plate displacements. Hence the combination of Eq. (16) and Eq. (19) gives the required pressure function in the thermoviscous fluid layer. If the plates are thin and the layer gap is small than the plates may be assumed to vibrate with the same displacement function. In such a situation:

$$\overline{w}_1 = \overline{w}_2 = \overline{w}$$

Let us also place the origin plane z=0 such that $$e_2 h_1 = e_1 h_2$$

Then it follows from Eq. (16), Eq. (17) and Eq. (18) that p0(x; y)=0, and after introducing δ the fluid layer gap $\delta = e_1 + e_2, \ldots$ p(1)(x; y) is given as:

$$\overline{p}^{(1)}(x,y) = j\frac{\omega}{2\delta}\chi((h_1+h_2)\overline{w}_{,xx}+(h_1+h_2)\overline{w}_{,yy})+j\omega\mu(\overline{w}_{,xx}+\overline{w}_{,yy})+\rho_o\omega^2\overline{w} \quad (20)$$

A Simple Plate Equation

After verifying the pressure function $p^{(0)}(x; y)$, let us write down the Love Kirchhoff equations for the configuration shown in FIG. 6.

$$\begin{cases} -\omega^2\rho_1 h_1 \overline{w}_1(x,y)+D_1\Delta^2 \overline{w}_1(x,y)=\overline{f}_1(x,y)-\overline{p}'(x,y,-e_1) \\ -\omega^2\rho_2 h_2 \overline{w}_2(x,y)+D_2\Delta^2 \overline{w}_2(x,y)=\overline{p}'(x,y,e_2)-\overline{f}_2(x,y) \end{cases} \quad (21)$$

In the above equation p' (x; y;−e1) is the pressure of the fluid layer acting on the first plate and p' (x; y; e2) is the pressure of the fluid layer acting on the second plate. f1(x; y) and f2(x; y) are the forces acting on the two plates. Substituting this pressure in terms of $p^{(0)}$ and $p^{(1)}$ the Love Kirchhoff equations become:

$$\begin{cases} -\omega^2\rho_1 h_1 \overline{w}_1(x,y)+D_1\Delta^2 \overline{w}_1(x,y)=\overline{f}_1(x,y)+e_1\overline{p}^{(1)}(x,y) \\ -\omega^2\rho_2 h_2 \overline{w}_2(x,y)+D_2\Delta^2 \overline{w}_2(x,y)=e_2\overline{p}^{(1)}(x,y)-\overline{f}_2(x,y) \end{cases} \quad (22)$$

In order to consider the plate and the thermoviscous fluid layer as one structure excited by the resultant force f(x; y)=f1(x; y)−f2(x; y), we add the two equations:

$$-\omega^2(\rho_1 h_1+\rho_2 h_2)\overline{w}(x,y)+(D_1+D_2)\Delta^2 \overline{w}(x,y)=\overline{f}(x,y)+(e_1+e_2)\overline{q}^{(1)}(x,y) \quad (23)$$

Substituting the expression for $p^{(1)}(x; y)$ in Eq. (23), the following equation is obtained:

$$L_p\{\overline{w}(x,y)\}+L_v\{\overline{w}(x,y)\}=\overline{f}(x,y) \quad (24)$$

where Lp is the modified operator for the plate and Lv is the viscous operator of the plate which has resulted from the asymptotic simplification. These are expressed as:

$$L_p = \omega^2(\rho_1 h_1+\rho_2 h_2+\rho_o\delta)+(D_1+D_2)\Delta^2$$

$$\mathcal{L}_v = -j\omega\left(\frac{h_1+h_2}{2}\chi+\delta\mu\right)\Delta$$

The term $\rho_0\delta$ is the equivalent mass and the term $$-j\omega\left(\frac{h_1+h_2}{2}\chi+\delta\mu\right)$$

working as the equivalent plate damping comes from the asymptotic analysis. Δ is the Laplacian operator. This equation corresponds to an equivalent plate which is expressed as:

$$(-\omega^2 M_{eq}+D_{eq}\Delta^2+j\omega\nabla\Delta)\{\overline{w}\}=\overline{f}(x,y) \quad (25)$$

Where $$M_{eq}=\rho_1 h_1+\rho_2 h_2+\rho_o\delta$$

$$D_{eq}=D_1+D_2$$

$$\Lambda = \left(\frac{h_1+h_2}{2}\chi+\delta\mu\right)$$

Equivalent Structural Damping

In order to find out the structural damping factor of the modified plate equation let us consider a one dimensional plate equation with the displacement function given as:

$$\overline{w}(x)=Ae^{jk_x x}$$

Substituting this expression in the homogeneous equivalent plate equation yields:

$$-\omega^2 M_{eq}+D_{eq}k_x^4+j\omega\nabla k_x^2=0 \quad (26)$$

Eq. 26 could be rewritten as:

$$-\omega^2 M_{eq}+D_{eq}k_x^4\left(1+j\omega\frac{\Lambda}{D_{eq}k_x^2}\right)=0 \quad (27)$$

It could be seen from Eq. (27) that the fluid layer introduces an imaginary plate stiffness associated to damping. In order to simplify the above expression, Eq. (26) is resolved for $k^2_x$. The result of this step is given as:

$$k_x^2 = \frac{-j\omega\Lambda \pm \mathcal{J}_1}{2D_{eq}} \quad (28)$$

Where $$J_1=\sqrt{-\omega^2\nabla^2+4\omega^2 D_{eq}M_{eq}},$$

Substituting Eq. (28), Eq. (27) is modified as shown below:

$$-\omega^2 M_{eq}+D_{eq}k_x^4\left(\frac{\mathcal{J}_1^2-\omega^2\Lambda^2}{\mathcal{J}_1^2+\omega^2\Lambda^2}+j\frac{2\omega\Lambda\mathcal{J}_1}{\mathcal{J}_1^2+\omega^2\Lambda^2}\right)=0 \quad (29)$$

Eq. (29) supposes that the term with in J1 is positive and therefore J1 is real. For very light materials with low rigidity the root becomes imaginary and the calculations are changed accordingly. Let $\eta_D$ be the loss factor due to the viscous layer, then this factor is identified as the ratio of the imaginary and real stiffness:

$$\eta_D = \frac{2\Lambda \mathcal{J}}{\mathcal{J}^2 - \Lambda^2}$$

Where $$\mathcal{J} = \sqrt{-\nabla^2 + 4D_{eq}M_{eq}}$$

It is interesting to note that $\eta_D$ is independent of the frequency. Using this value of $\eta_D$, the plate equation could finally be written as:

$$-\omega^2 M_{eq} + D_{eq} k_x^4 \frac{\mathcal{J}^2 - \Lambda^2}{\mathcal{J}^2 + \Lambda^2}(1 + j\eta_D) = 0 \quad (30)$$

FIG. 7 describes an equivalent plate. The plate comprises of two very thin layers of solid material which enclose a very thin layer of a highly viscous fluid. The fluid material used for both the calculation and the experimental validation is Rhodorsil® 47 V 500,000.

Although most of the properties are provided by the vendor, the second coefficient of viscosity, i.e., $\eta$ is not known, which is a major constituent of the bulk viscosity $\mu_B$. Hence $\mu_B$ has been set equal to zero owing to the fact that in this model shear of the fluid is the dominant mode in the plate vibration and since the viscosity is very high, the molecules of the fluid adhere to each other and therefore do not move considerably. The movement of molecules away from their equilibrium position is a major factor in the calculation of the second coefficient of viscosity. This leads us toward a negligible value of this coefficient. This assumption is justified by the results obtained through experimental validation. In Table (1) is shown the viscous structural damping factor for a variety of commonly used materials with variable thickness values. The results clearly show that using very thin plates with a highly viscous fluid layer may considerably increase the damping coefficient of the structures. In Table (1), three materials have been used out of which glass has the highest damping factor and steel has the lowest for the configurations used. It can also be noticed that thinner the sandwich plates, higher the damping loss factor. In Table (2) the influence of the layer thickness is investigated. It is observed dhot the damping loss factor increases with the increase in the fluid layer thickness.

TABLE 1

Equivalent Structural Damping Factor for Various Commonly Used Materials.
Structural Damping Coefficient

| Material | Fluid | δ (mm) | h₁ (mm) | h₂ (mm) | $\eta_D$ |
|---|---|---|---|---|---|
| Aluminum | Rhodorsil® 47 V 500,000 | 0.2 | 0.4 | 0.4 | 0.1004 |
|  |  | 0.2 | 0.8 | 0.8 | 0.0426 |
|  |  | 0.2 | 0.8 | 0.4 | 0.0521 |
| Glass | Rhodorsil® 47 V 500,000 | 0.2 | 0.4 | 0.4 | 0.1114 |
|  |  | 0.2 | 0.8 | 0.8 | 0.0473 |
|  |  | 0.2 | 0.8 | 0.4 | 0.0578 |
| Steel | Rhodorsil® 47 V 500,000 | 0.2 | 0.4 | 0.4 | 0.0365 |
|  |  | 0.2 | 0.8 | 0.8 | 0.0153 |
|  |  | 0.2 | 0.8 | 0.4 | 0.0188 |

TABLE 2

Influence of Fluid Film Thickness on the Equivalent Structural Damping Factor.
Structural Damping Coefficient: Influence of the Fluid Film Thickness

| Material | Fluid | δ (mm) | h₁ (mm) | h₂ (mm) | $\eta_D$ |
|---|---|---|---|---|---|
| Aluminum | Rhodorsil® 47 V 500,000 | 0.1 | 0.4 | 0.4 | 0.0797 |
|  |  | 0.2 | 0.4 | 0.4 | 0.1004 |
|  |  | 0.4 | 0.4 | 0.4 | 0.1729 |
| Glass | Rhodorsil® 47 V 500,000 | 0.1 | 0.4 | 0.4 | 0.0884 |
|  |  | 0.2 | 0.4 | 0.4 | 0.1114 |
|  |  | 0.4 | 0.4 | 0.4 | 0.1915 |
| Steel | Rhodorsil® 47 V 500,000 | 0.1 | 0.4 | 0.4 | 0.0286 |
|  |  | 0.2 | 0.4 | 0.4 | 0.0365 |
|  |  | 0.2 | 0.4 | 0.4 | 0.0639 |

Experimental Validation

An experimental validation has been performed using two Brüel & Kjær type MM 0002 noncontact sensors. The Magnetic Transducer Type MM 0002 is a variable reluctance (moving-iron) device which can be used as a velocity sensitive vibration pick-up or an electromagnetic vibration exciter. These transducers form part of a well known device "Oberst Apparatus", which was developed by Dr. H. Oberst. The practical is performed on two aluminium plates which have a thickness of 0.65 mm and they measure 495 mm in breadth and 595 mm in length. The fluid layer is made up of Rhodorsil® 47 V 500,000 oil and its thickness is 0.25 mm.

One of the plates is fixed in the jig. Oil is then poured carefully on the first plate whose boundaries are already sealed with silicon. The second plate is posed directly on top of the first plate. After the plates are leveled and the oil is well distributed the second plate is also sealed with silicon. Since aluminium is nonmagnetic, a high permeability iron disc is glued onto the plate just below the transducers to complete the magnetic circuit. One of the magnetic transducers is attached to the Agilent 33220A 20 MHz Function Generator 20 through Brüel & Kjær Power Amplifier type 2706 and is, thus, used to excite the double plate assembly. The other transducer is attached to Brüel & Kjær Measuring Amplifier 20 (20-20 kHz type 2609), and measures the vibration of the plate. The experimental setup is shown with the help of FIG. 8.

The experimental damping coefficients are obtained by using the formula Δf/fr. where Δf is the difference around the resonance frequency fr, when the vibration levels decrease by −3 dB around the critical frequency. This is further elaborated in FIG. 8. The results are shown with the help of Table (3) for four resonant frequencies of the system. The experiments were conducted more than once and approximately the same results were achieved. It could be observed that the theoretical and the practical results are in a good agreement.

TABLE 3

Experimental Validation of the Equivalent Plate Model with $h_1 = h_2 = 0.65$ mm and δ = 0.25 mm.
Experimental Validation Structural Damping Coefficient

| Frequency (Hz) | $\eta_D^{theoretical}$ | $\eta_D^{experimental}$ | Difference % |
|---|---|---|---|
| 59.3 | 0.0596 | 0.0523 | 12.25 |
| 73.9 | 0.0596 | 0.0501 | 15.94 |
| 89.7 | 0.0596 | 0.0502 | 15.77 |
| 124.8 | 0.0596 | 0.0545 | 8.56 |

CONCLUSION

This approach yields very promising results, particularly the fact that damping loss factor is constant with frequency and allows high damping of panels at low frequency. If a highly viscous fluid is inserted between two very thin plates then high damping coefficients may be obtained.

The invention claimed is:

1. A multilayer composite material comprising at least one core interposed between two external layers, wherein:
   the core is a layer of thermoviscous fluid at room temperature, said thermoviscous fluid having a dynamic viscosity coefficient greater than 100 Pa·s at room temperature, the thickness of the thermoviscous fluid layer being less than or equal to twice an acoustic limiting layer of the thermoviscous fluid,
   each external layer is in a material in a solid state at room temperature, each external layer having a surface mass of less than 8 kg/m$^2$.

2. The multilayer composite material according to claim 1, wherein the thickness (5) of the thermoviscous fluid layer (3) is between 0.001 millimeter and 3 millimeters.

3. The multilayer composite material according to claim 1, wherein the viscosity coefficient of the thermoviscous fluid layer (3) is greater than 240 Pa·s, and preferentially greater than 480 Pa·s.

4. The multilayer composite material according to claim 1, wherein the thermoviscous fluid layer (3) is made of silicone oil.

5. The multilayer composite material according to claim 1, wherein the external layers (1, 2) are made of different materials.

6. The multilayer composite material according to claim 1, wherein the external layers (1, 2) are of different thicknesses (h1, h2).

7. The multilayer composite material according to claim 1, wherein the external layers (1, 2) are attached together.

8. The multilayer composite material according to claim 1, wherein the thermoviscous fluid layer (3) is trapped by confining it between the external layers (1, 2).

9. The multilayer composite material according to claim 1, comprising a plurality of cores (3, 3', 3'') between both external layers (1, 2), said cores being separated from each other with layers (6, 7) in a material in the solid state at room temperature and having a surface mass of less than 8 kg/m$^2$.

10. A method for making a multilayer composite material comprising at least one core interposed between two external layers, the core being a thermoviscous fluid layer at room temperature, and each external layer being in a material in the solid state at room temperature, the method comprising the calculation (10) of a viscosity coefficient as a function of:
    the respective thicknesses of the fluid layer and of the external layers,
    the material making up each external layer,
    a desired acoustic loss factor.

11. The method according to claim 10, comprising a substep of determining (11) the flexural stiffness of each external layer from the material making them up.

12. The method according to claim 10 or claim 11, comprising a substep of determining (12) the surface mass of each external layer from the material making them up.

13. Use of a material as defined according to claim 1, 2, 3, 4, 5, 6, 7, or 8 as a device for damping vibratory waves.

14. Use of a thermoviscous fluid layer at room temperature, said thermoviscous fluid having a dynamic viscosity coefficient greater than 100 Pa·s at room temperature, between two external layers in the material in the solid state at room temperature, each external layer having a surface mass of less than 8 kg/m2 as an agent for damping vibratory waves.

* * * * *